J. J. G. PAUILHAC.
SEMI-AUTOMATIC MACHINE FOR CHARGING SPORTING CARTRIDGES.
APPLICATION FILED JULY 31, 1911.

1,174,343.

Patented Mar. 7, 1916.
5 SHEETS—SHEET 1.

J. J. G. PAUILHAC.
SEMI-AUTOMATIC MACHINE FOR CHARGING SPORTING CARTRIDGES.
APPLICATION FILED JULY 31, 1911.

1,174,343.

Patented Mar. 7, 1916.
5 SHEETS—SHEET 2.

Witnesses,

Inventor,
Jean J. G. Pauilhac,
By Foster, Freeman, Watson & Coit,
Attorneys.

J. J. G. PAUILHAC.
SEMI-AUTOMATIC MACHINE FOR CHARGING SPORTING CARTRIDGES.
APPLICATION FILED JULY 31, 1911.

1,174,343.

Patented Mar. 7, 1916.
5 SHEETS—SHEET 3.

Witnesses,

Inventor,
Jean J. G. Pauilhac,
By Fisher, Freeman, Watson & Coit
Attorneys,

J. J. G. PAUILHAC.
SEMI-AUTOMATIC MACHINE FOR CHARGING SPORTING CARTRIDGES.
APPLICATION FILED JULY 31, 1911.
1,174,343.
Patented Mar. 7, 1916.
5 SHEETS—SHEET 4.
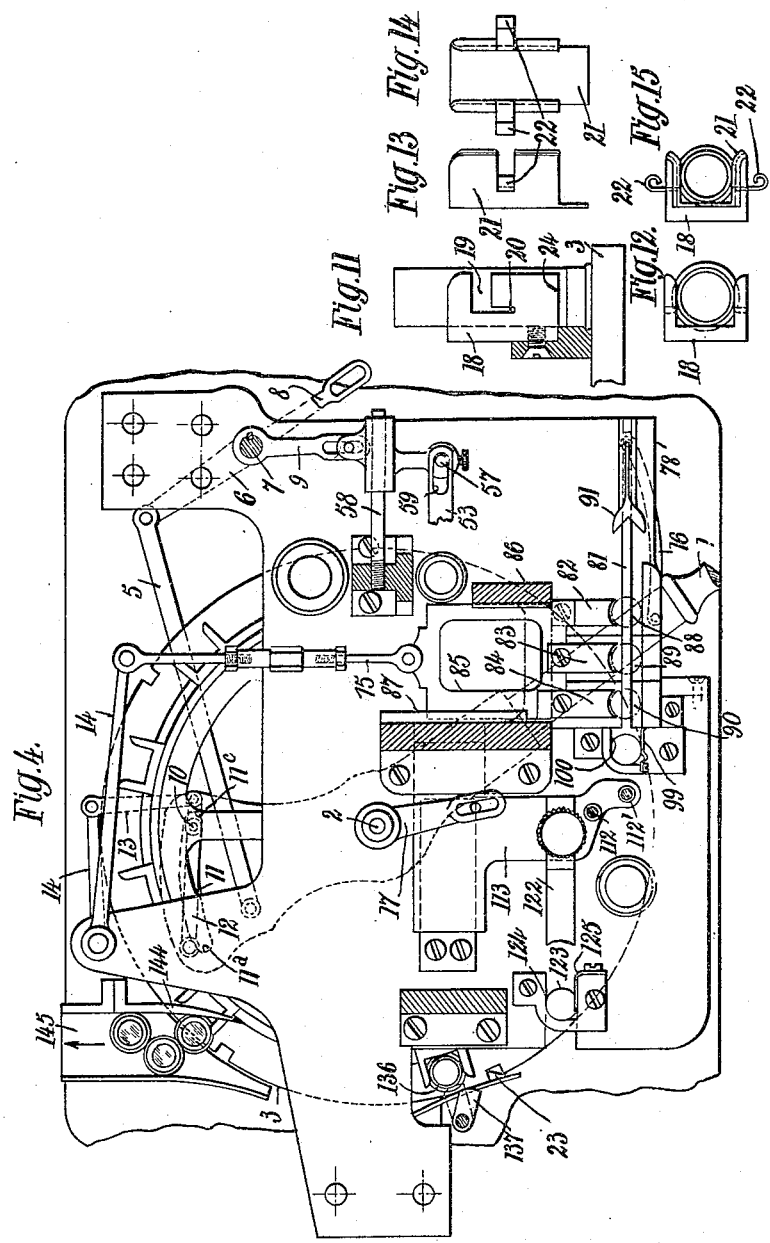
Witnesses:
BCoPust
G. B. Sheehy.
Inventor.
Jean J.-G. Pauilhac,
By Fisher, Freeman, Watson & Coit,
Attorneys.

J. J. G. PAUILHAC.
SEMI-AUTOMATIC MACHINE FOR CHARGING SPORTING CARTRIDGES.
APPLICATION FILED JULY 31, 1911.
1,174,343.
Patented Mar. 7, 1916.
5 SHEETS—SHEET 5.
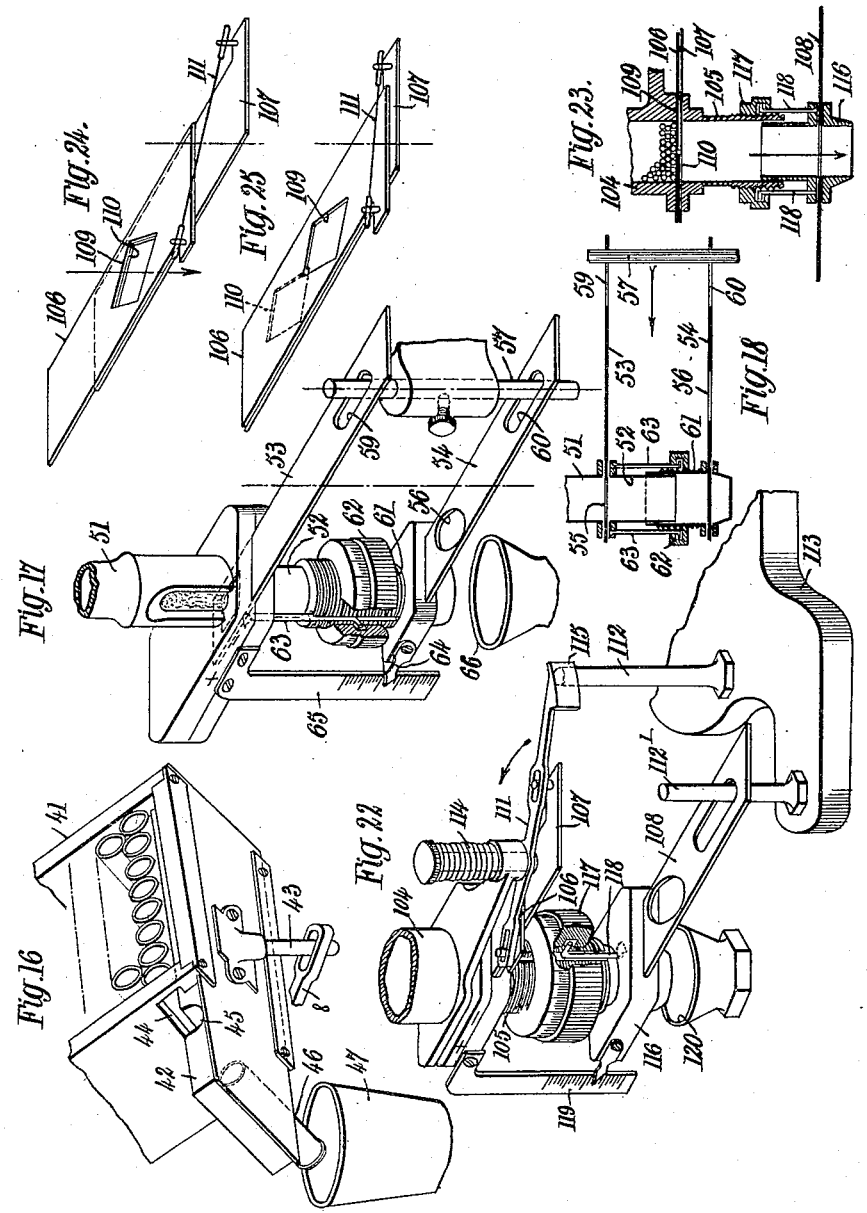

UNITED STATES PATENT OFFICE.

JEAN JACQUES GEORGES PAUILHAC, OF PARIS, FRANCE.

SEMI-AUTOMATIC MACHINE FOR CHARGING SPORTING-CARTRIDGES.

1,174,343.

Specification of Letters Patent.

Patented Mar. 7, 1916.

Application filed July 31, 1911. Serial No. 641,479.

*To all whom it may concern:*

Be it known that I, JEAN JACQUES GEORGES PAUILHAC, a citizen of the French Republic, residing at 59 Avenue Malakoff, Paris, France, have invented certain new and useful Improvements in Semi-Automatic Machines for Charging Sporting-Cartridges, of which the following is a specification.

The machine for charging sporting cartridges which constitutes the present invention only effects automatically the distribution of the various elements (cartridge cases, powder wads, shot, closing disks) necessary for making the cartridge and leaves the workman who is in charge of it the work of driving the wads and the closing disk into each case, and setting the filled cases, these latter operations being performed much better by hand than by the various kinds of automatic mechanism, however perfect they may be.

The drawings illustrate by way of example, a machine of the kind described above.

Figure 1:
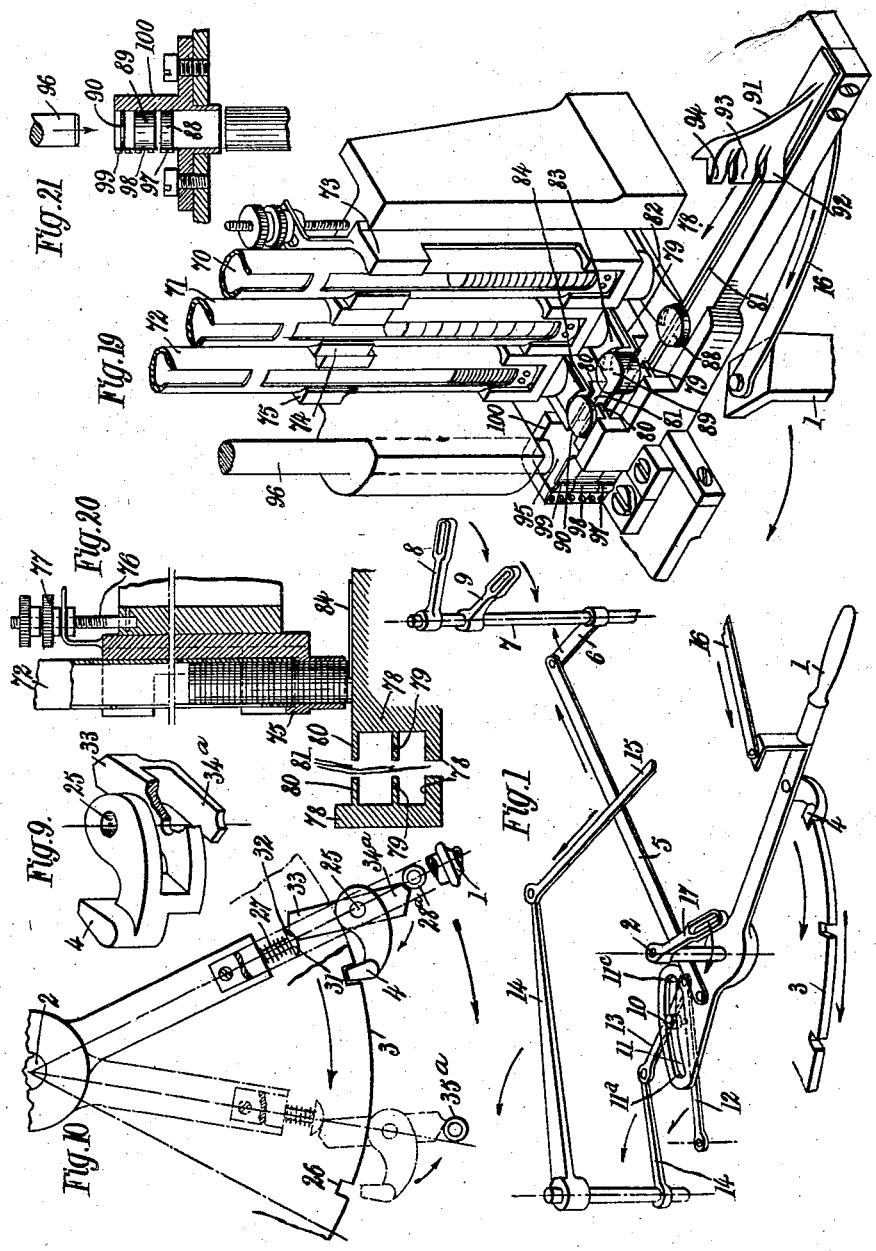
Figure 2:
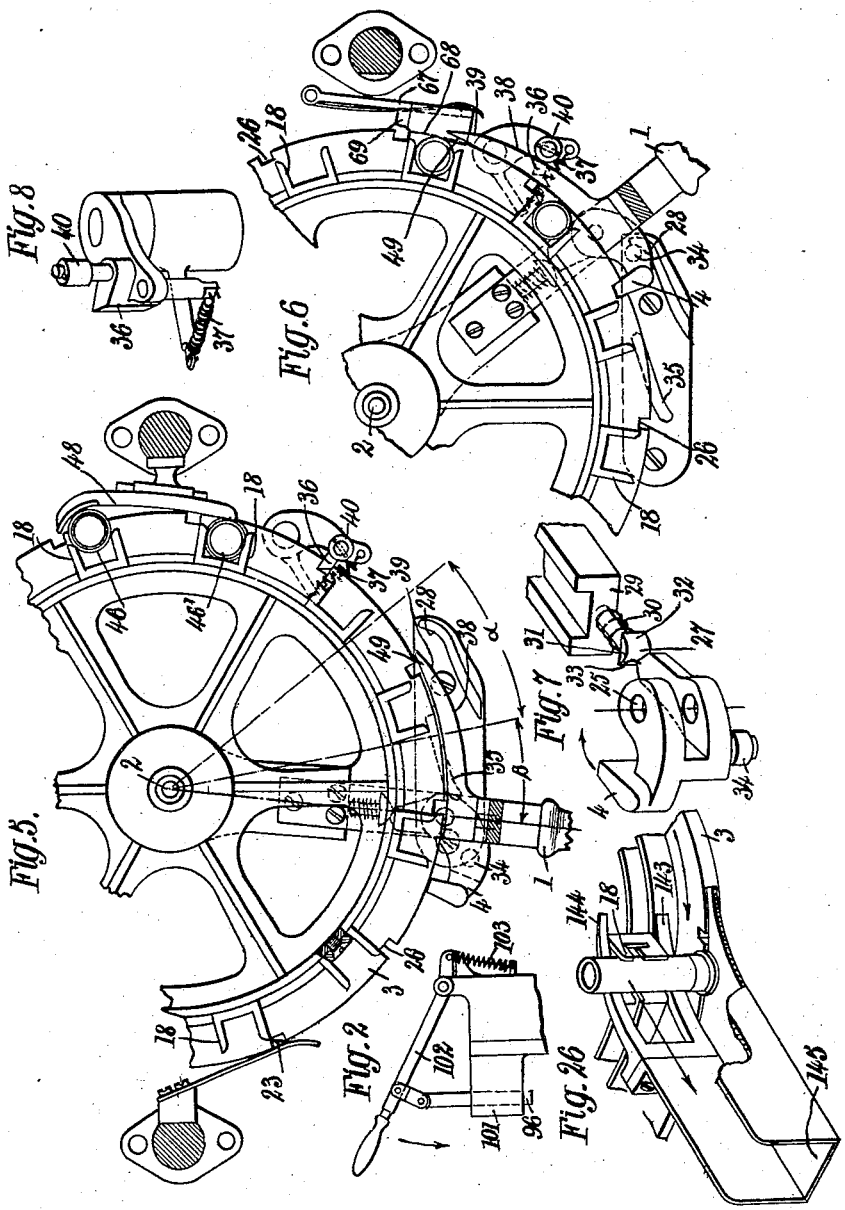
Figure 3:
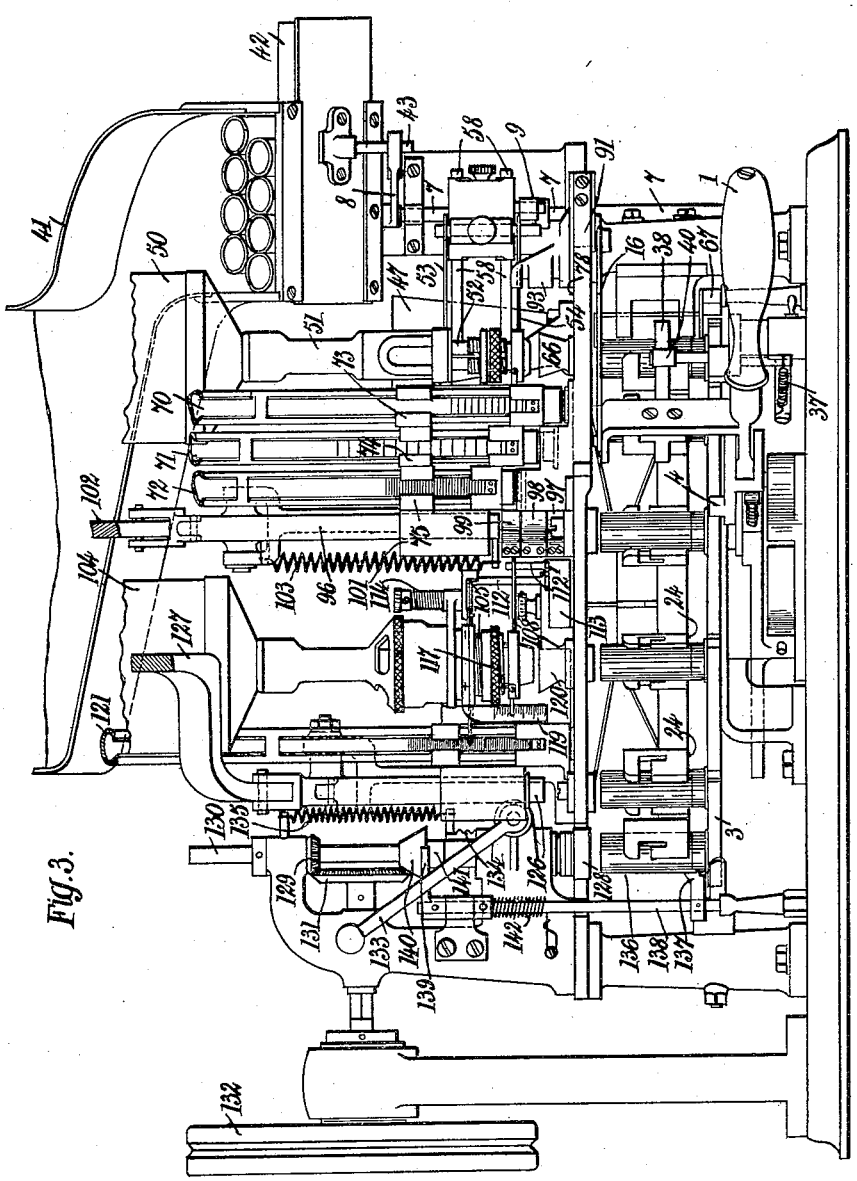

In these drawings Figure 1 is a diagram showing the connection of the general operating lever with the mechanism for actuating the revolving table and with the auxiliary levers of the different distributers. Fig. 2 is a diagram of one of the hand-operated rammers. Fig. 3 is an elevation of the machine. Fig. 4 is a diagrammatic plan view of the various operating devices. Figs. 5, 6, 7 and 8 represent different views of the mechanism for actuating and stopping the revolving table. Figs. 9 and 10 illustrate a modified form of these devices. Figs. 11, 12, 13, 14 and 15 illustrate details of holders on this table. Fig. 16 is a perspective view of the lower part of the case distributer. Fig. 17 is a perspective view of the powder distributer. Fig. 18 a section of this distributer. Fig. 19 is a perspective view of a multiple diverse-wad distributer, the wad carriage and the wad-collector combined with this distributer. Fig. 20 is a section of this latter apparatus, taken through the axis of the last distributing tube. Fig. 21 is a section through the axis of the wad collector. Figs. 22 and 23 are perspective and sectional views of the shot distributer, and Figs. 24 and 25 show the two positions of the measuring diaphragm of this distributer. Fig. 26 shows the ejector in perspective.

In these different figures the same reference letters indicate the same parts.

General operating lever.

The general operating lever 1 (Fig. 1) pivots around the pin 2, and has an alternating motion imparted to it by hand. This lever is connected:—

1st. To the operating-pawl 4 for the conveying table 3.

2nd. To the case-distributer through a rod 5 linked to a lever 6 mounted on a shaft 7 which carries the operating arm 8 of this distributer.

3rd. To the powder-distributer by the same rod 5, the same lever 6 and the same shaft 7 which carries a second operating arm 9 of this distributer.

4th. To the wad-distributer, by a roller 10 which runs in a curved groove 11 eccentric in relation to the shaft 2 (the distance from the end 11ª of this groove to the shaft 2 being greater than from the end 11ᶜ) and which is formed so that the wads may be correctly pushed. This roller 10 is carried by a lever 12 which is linked to a rod 13 that is connected through a return lever 14 with the rod 15 of this wad-distributer.

5th. To the wad-slide of this distributer by a rod 16 linked to it.

6th. To the shot distributer, by the arm 17 mounted on the shaft 2.

7th. To the card-board closing disk distributer, by the same arm 17.

As has been stated, the rammers and the setting device are entirely independent of the devices previously mentioned, and are operated separately by the workman in charge of the machine. A full description of them will, moreover, be given in due time.

Conveying table.

The conveying table 3 loosely mounted on the shaft 2 receives the empty cases supplied by the case-distributer and conveys them successively below each of the following distributers. In order that it may fulfil this double purpose it is provided with holders for receiving the cases, etc. and by means of a special device it receives an intermittent rotary motion in one direction.

*a. Holders for receiving the cases.—* These holders 18 (Figs. 3, 4, 11 and 12) are arranged around the circumference of table 3 concentric to the shaft 2. In Figs. 3 and 4 the table is represented as having twelve of these holders. As seen in plan (Figs. 4 and 12) each holder is in the form of the letter U, the distance between the arms of which is equal to the external diameter of a case, the sides are parallel to the radius passing through the middle of the U and, as seen in elevation, each of the arms of the U has a notch formed with a horizontal part 19 and a vertical part 20. These arms are, moreover, at a certain distance above the table 3. The notches 19 and 20 are intended for enabling linings 21 to be introduced into the holders 18. These linings which are likewise of U shape are of variable thickness, and serve for reducing the size of the holders when it is desired to use the machine for charging cartridges of smaller caliber. In mounting these linings, the lugs 22 on their parallel arms are forced in horizontally, to the bottom of the notches 19, the lining is then lowered vertically until said lugs reach the bottom of the vertical notch 20. The free space between the lower edge 24 of each holder and the table 3 enables the bent arm of an ejector to be inserted between the bottom of a holder, and the case contained therein, as will be indicated in the description of the ejector.

*b. Devices for actuating and stopping the conveying table.*—The actuating device enables the table to be rotated, at each movement of the lever 1, to an extent equal to the angular distance between two successive holders. This movement can be effected in various ways. Figs. 5 to 8 illustrate mechanism which enables the table to be actuated in the necessary manner. Figs. 9 and 10 show a modification of this mechanism. The device illustrated in Figs. 5 to 8 consists of the pawl 4 which is pivotally mounted on the lever 1 and acts in combination with indentations 26 in the table 3, a detent 27 carried by the lever 1 and a cam 28 fixed to the frame of the machine. The form of the head of the pivoting pawl 4 corresponds exactly with that of the indentations 26 in order that, when the pawls engaged in an indentation, there may be no play between the table 3 and the lever 1. The opposite end of the pawl is bifurcated to receive the lever 1 and in such bifurcated section are formed the bearings 25 for the pivot connecting the pawl and lever. The detent 27, Figs. 6 and 7, which acts in combination with the pawl 4 is formed by a rod which is axially movable in a piece 29 fixed on the lever 1. This rod is subjected to the action of a spring 30, wound on it between its projecting head 27 and its mounting 29. The head 27 terminates in two oppositely inclined surfaces 31 and 32. These two cam faces are arranged opposite a spur 33, firmly connected with the pawl 4, and symmetrical with relation to a line connecting the axis of the detent 27, with the axis of rotation of the pawl. In these circumstances, if the pawl 4, be moved in the direction of the arrow Fig. 7, the spur 33 pushes the detent 27 inward, in passing over the inclined surface 31, compressing the spring 30, and, immediately after clearing said surface 31, the spring 30 expands pushing the spur 33 sharply to the right, thus causing a complete swing of the pawl 4. When the lever 1 is completely to the left (Fig. 5) the pawl 4 is not engaged in an indentation 26, consequently, if the lever be moved toward the right, the table is not actuated, a roller 34 mounted on the lower part of the pawl 4 engages with the cam 28 which is eccentric in relation to the shaft 2. The cam 28 acting on the roller 34 as the lever 1 moves to the right from its normal position rocks pawl 4 in the direction of the arrow in Fig. 7 at the very moment when this pawl comes in front of an indentation 26. The movement of pawl 4 thus started by the cam 28 is completed by the detent 27 which brings the pawl into the indentation situated in front of it, and which, from this moment, holds it stationary at the bottom of this indentation. At the time that the pawl 4 is disengaged from the table the latter is held from movement with the lever 1 by a spring-pressed safety catch or pawl 23. The table is thus connected with the lever 1 and will be actuated by this lever in its return movement. When the table has rotated through an angle α equal to the angular distance between two consecutive holders, it is disconnected from the lever 1. A cam 35 eccentric in relation to the shaft 2 and arranged in the course of the roller 34 enables this result to be obtained by causing a rocking of the pawl 4 is a direction contrary to that of the arrow in Fig. 7, said movement being continued by action of the detent 27 to effect removal of this pawl from the indentation in the table. The return movement of the lever is then continued freely so as to effect the operating of the distributers. This lever is moved into the position shown in Fig. 5, thus the distributers are put in action during the angular movement B.

Instead of the movements of the pawl being produced by means of the cams 28 and 35 which act on the roller 34, they may be produced as indicated in Figs. 9 and 10 by the employment of an abutment 34ª firmly connected with the pawl 4 and two spurs 28ª and 35ª which form stops or abutments and perform the same function as the cams 28 and 35 in the preceding figures.

For the purpose of exactly limiting the rotation of the table 3 to the angular distance between two consecutive holders and avoiding any extra even slight actuating of this table, for example under the influence of its inertia, a pawl 36 capable of exactly engaging in a notch 26 is arranged at the periphery of the table and pushed by a spring 37 into the notch 26 which is in front of it at the moment when the pawl 4 is released (Fig. 5). This pawl 36 remains in engagement with the table until a horizontal arm 38 firmly connected with the lever 1, by means of its cam surface 39, acting on a roller 40 mounted on the pawl, removes the latter from the table and entirely releases it from the notch 26 in which it was engaged (Fig. 6). The arm 38 holds the pawl 36 in this position during the commencement of the following return movement of the operating lever, so that when the arm 38 leaves the pawl, the notch 26 in which it was previously engaged is no longer opposite to it. A smooth cylindrical part of the table is in front of this pawl, which from this moment can no longer oppose the actuating movement of the table. After one twelfth of a revolution has been effected another indentation comes in front of the pawl 36, and a stoppage is once more effected. A second pawl or catch 23 arranged in the opposite direction resists any retrograde movement of the table at the moment when the pawl 4 and the arm 36 are neither of them in engagement with the table in the return movement of the lever. Other actuating and stopping devices may of course be substituted for those just described.

*Case distributer.*—This apparatus (Figs. 3 and 16) comprises a case reservoir and a distributing device which takes the cases from this reservoir one by one and brings them above the conveying table onto which they fall by gravity. The case-reservoir consists of a large box 41 (Fig. 3) of suitable form with an inclined bottom. The cases rest on this bottom. The lower part of this reservoir is contracted and has a scoop or spout 45 situated in a slide 42 which has a reciprocating motion imparted to it by means of a rod 43 actuated by the arm 8 connected to the lever 1 as already described. The slide 42 passes through openings 44 formed in the sides of the reservoir (one of these openings is seen in Fig. 16) so that it comes partially beyond these sides. The spout 45 on this slide is of a width equal to the diameter of a case and is so situated on the slide that the alternating movement of the slide brings it at one time into the reservoir 41 (Fig. 3) and at another time out of the reservoir above the table 3 (Fig. 16). This alternating movement of the slide 42 causes in the box 41 a slight disturbance of the cases which roll and therefore cannot become wedged together. Thus a case falls into the spout 45 when this latter reënters the reservoir. When the slide 42 returns to the left and carries the spout outside the receptacle 41, the case 40 which is in this spout is thus carried outside the receptacle. Being no longer supported below, it falls with its base downward and the other end above into a hopper 47 arranged below the distributer and above the conveying table and which guides the falling case 46 between a holder of this table (Fig. 5) and a cam 48 mounted on the frame of the machine and eccentric in relation to the shaft 2. When the table is set in motion, the case 46 in passing longitudinally of the cam surface 48 is forced into its holder, bringing it into the position of the case 46′ in Fig. 5. At this moment the conveying table is stopped. The case is now below the powder distributer.

In order to keep the case wedged at the bottom of its holder and to make the wedging complete in case the cam 48 should only be adapted for beginning the wedging, the arm 38 is provided on the inside with a cam surface 49 which forces the case toward the axis of the table and wedges it completely to the bottom of the holder.

*Powder distributer.* (Figs. 3, 17 and 18.)— This distributer consists of a reservoir and a measuring vessel which pours the required quantity of powder into the empty case brought below it. The powder reservoir 50 is a cylinder terminated at the bottom by a tube 51 mounted above the measuring vessel 52, a telescopic tube open at its two ends forms this measuring vessel, a diaphragm 53 enables the upper end of this tube to be closed and a second diaphragm 54 runs through its lower part. Each of these diaphragms 53 and 54 has an opening (an opening 55 for the former and an opening 56 for the latter) which can be placed in the axis of the measuring vessel, but the two openings 55 and 56 are not arranged one below the other so that if one is in the axis of the vessel the other is completely outside of it. (Figs. 17 and 18). The diaphragms 53 and 54 are controlled by a single rod 57 engaged in slots 59 and 60. The rod 57 is firmly connected with a sleeve which is movable on two fixed rods 58 (Figs. 3 and 4) under the action of the arm 9 which is connected with the lever 1 as already described. This arm thus communicates simultaneously to the two diaphragms movements from right to left and from left to right with stops at each end of the course. In Figs. 17 and 18 the diaphragms are in their extreme position to the right. The opening 55 alining with the vessel 52 which thus communicates with the powder reservoir and fills completely. The diaphragm 54 closes the lower part of this vessel while it is thus being filled. The diaphragms are then moved to the left. The diaphragm 53 closes the communication between the reservoir and the measuring vessel; the opening 56 in the lower slide is brought into alinement with the measuring vessel and the measured quantity of powder confined between the two diaphragms drops freely through a hopper 66 into the empty case held below.

In order that the quantity of powder delivered by the vessel 52 may be varied as desired, the part of this vessel between the two diaphragms comprises a telescopic tube the upper branch 52 of which is fixed to the frame of the machine while the lower branch 61 which carries the lower diaphragm 54 is movable vertically by means of a nut 62 engaging threads on said tube section and supported at a fixed distance from the frame of the machine by rods 63. A pointer 64, fixed to this tube, moves in front of a scale 65 borne by the frame and enables the capacity of the measuring vessel to be known at any moment. A scale on the nut 62 gives the divisional fractions. By turning the nut 62, which is held from movement vertically, the lower tube member 61 may be moved up or down, the extent of movement being shown by the pointer 64 and scale 65. Thus the capacity of the measuring vessel can be regulated with the greatest precision.

To assist the operator in effecting the desired adjustments suitable indicating marks, such as + and —, are properly positioned on the frame adjacent said scales. If the nut 62 is turned to the left the capacity of the measuring vessel will be increased and by turning the nut toward the right, the capacity of the measuring vessel is diminished.

The powder-distributer which has just been described can evidently be replaced by any distributer of a known kind capable of being adapted to the machine.

In order to prevent any operation of the powder distributer when the holder arrested below this distributer contains no case, and consequently to avoid the loss of powder on the table and the base plate of the machine, a bolt 67 (Fig. 6) mounted on the frame blocks the whole machine when the holder referred to is empty. This bolt is situated below the distributer 42 in front of the holder which stops below this distributer. It consists of a spring pivoted lever which has a nose 68 and a spur 69. The spring of the lever constantly tends to push the nose 68 into the holders which come in front of it and the spur into one of the notches 26 in the table. When a case fills the holder positioned opposite the nose 68, this case holds the nose out of the table and the spur out of the notches. Thus the table can rotate, actuated by the lever 1, and the distributers act normally, but if the holder referred to is empty, the spur 69, pushed freely by the spring of the lever, engages in the notch 26 in front of it and completely blocks the table 3 which can not longer be actuated by the lever 1. As the pawl 4 is then in engagement with the table, the lever 1 itself is stationary and with it all the distributers. It is only necessary to introduce a cartridge into the empty holder in order to enable the machine to start again. For this purpose the bolt is removed by hand and the table moved forward very slightly so as to expose the empty holder and the missing case is inserted by hand. The case charged with powder is conveyed to the wad-distributer, the rammer of which is placed two twelfths of a revolution farther on.

*Wad distributer*, (Figs. 3, 4, 19 and 20.)— This apparatus differs from wad-distributers employed in automatic machines for charging cartridges in this respect, that it conveys automatically at one stroke, and in the required order, below a single rammer, any number of wads and cardboard disks of which the wadding should be composed, thus enabling all these wads and disks to be rammed into the cases with one stroke of the rammer. In the machine illustrated the arrangement is that of three wads of a certain thickness and nature for example: a thick cardboard disk, an oily wad and a thin cardboard disk are put on the powder. These three elements are supplied by three distributing tubes 70, 71, 72 arranged side by side, each containing wads of the different quality: the first thick cardboard disks, the second oily wads and the third thin cardboard disks. These tubes are borne by sleeves 73, 74, 75 each of which can be regulated in regard to height by means of a screw and a milled nut. This arrangement is illustrated in detail in Fig. 20 which shows the screw 76 and the nut 77 for regulating the sleeve 72.

The distributing tubes are arranged above plates forming steps and each of them is suspended above the plate placed below it at a distance regulated as has just been indicated, and which as regards each tube is very slightly greater than the thickness of the wads contained in this tube so that the last wad which rests directly on the plate is completely released from its distributing tube (see Fig. 20). The lower plate is formed by the table 78 above which is the first distributing tube 70. The second tube 71 is above the second plate 79 and the third tube 72 is above the third plate 80.

If the machine has more than three distributing tubes, these would be placed above supplementary steps which would follow the two former. The arrangement is easily understood. Toward the front of the machine each plate is crossed by a passage 81 in which the wad-slide 91 moves. Moreover, the various plates leave below them spaces which form superposed passages (see Fig. 20) through which the various wads are pushed by the slide 91 and wedged in the wad-collector 95 below the rammer, as will be described farther on.

On the plate 78, 79, 80 wad-pushers 82, 83, 84 each of which passes below the distributing tube are reciprocated. Each of these wad-pushers is of a thickness slightly less than that of the wad which it has to move. Its front end may be in the form of an arc of a circle (Fig. 4) and, be beveled (Fig. 19) according to the case. The alternating movement of the wad-pushers is due to a single slide 85 which is connected with the rod 15 already described and which is movable between cheeks 86 and 87 firmly connected with the table 78 (Fig. 4). In their forward movement the wad-pushers force the wads 88, 89, 90 in front of them. The wads rest on the plates above the passage 81 in the positions shown in Fig. 19. In order that the wads may not fall into this passage, the width of the latter is less than the radius of the wads.

The wad-pushers 82, 83, 84 are simply screwed on to the slide 85 so that they may be easily removed and be replaced by others according to the thickness of the wads which it is desired to employ.

As mentioned at the beginning of the specification the lever 1 is connected with the rod 15 through the medium of a roller 10 which slides in a groove 11 eccentric in relation to the shaft 2. This groove is formed so as to produce a very gentle movement of the wad-pushers at the end of their course for the purpose of avoiding any improper movement or jumping of the wads on the machine.

*Wad-slide.*—The wad-slide (Figs. 3, 4 and 21) combined with the wad-distributer is intended for bringing the wads 88, 89 and 90 simultaneously above the case charged with powder in the required order below the rammer by means of which the workman forces them into the case. This slide consists of a member 91 that moves in the passage 81 in the table. Along the member 91 sweepers 92, 93 and 94 are fixed. The number of these sweepers is equal to the number of the plates, and each of the sweepers moves above the corresponding plate, carrying along, as soon as it meets it, the wad left on this plate by the corresponding wad-guide. The movement of the member 91 is due to the rod 16 which, as shown, is linked directly to the lever 1. When the wad-pushers have brought the wads 88, 89, and 90 above the passage 80 and are at the end of their front course, the wad-slide is at the end of the back course, that is to say in its farthest position from the wads (Fig. 19) and the lever 1 is thus at the end of its course to the right. When this lever is moved to the left the wad-pushers begin to recede and the wad-slide to advance (see the various arrows in Fig. 19). When the wad-slide comes near the wad that is closest to it,—the wad 88, the wad-pushers have already receded sufficiently to free completely the path taken by the sweepers of the wad-slide and to allow this latter to pick up successively the wads distributed, to convey them and to wedge them in the wad-collector 95.

In order that the sweepers belonging to the wad-slide may push the wads properly in front of them and exactly in the axis of the passage 81, they are notched in V form, the apex of the V being in the axis of this passage (see Figs. 4 and 19). The wads thus conveyed into the collector remain suspended in this collector between the rammer and the case charged with powder (Fig. 21). This result is obtained by means of flexible plates 97, 98 and 99 which are at a distance from the opposite side 100 of the collector slightly less than the diameter of the wads. These plates thus press the wads against the opposite side 100, and keep them suspended between the rammer and the case being charged. The number of the flexible plates is equal to the number of wads in order that each wad may be reliably suspended, even if its diameter differs from the others.

*Rammer.*—This is operated independently of the lever 1. It consists of a rod 96 (Fig. 2) guided vertically by a slideway 101 fixed to the frame of the apparatus. This rod is linked to a hand lever 102 through the medium of a connecting rod and is returned to its upper position by a spring 103. In lowering the lever 101 the workman forces the three wads at one stroke into the case charged with powder, and when he feels that he has applied sufficient pressure, he releases his lever. When the cartridge has been wadded the workman turns the lever 1 and so brings the wadded case below the shot-distributer.

*Shot distributer.*—This apparatus (Figs. 3, 4, 23, 24, and 25) consists like the powder distributer of a reservoir and a measuring vessel which is alternately filled and emptied by means of diaphragms arranged in its upper and lower parts. When one of these is open the other is closed. The construction of this distributer differs, however, from that of the powder-distributer because, in order to separate a quantity of shot from a given quantity of small shot without cutting them, a special device is necessary. That which is described here is a diaphragm, the opening in which becomes smaller gradually from the center to the ends under the action of a spring.

In Figs. 3, 4, 22 and 23, the shot reservoir, 104 and the measuring vessel 105 are shown. The lower diaphragm 108 of this measurer is similar to the diaphragm 54 belonging to the powder measurer. The upper diaphragm the opening in which closes by becoming smaller may be formed by one of those apparatus known in photography as a shutter diaphragm. In this case this diaphragm is formed very simply by two thin superposed metal plates 106 and 107 provided with openings 109 and 110 of the same dimensions. These openings have for example the form of a lozenge, and the plates provided with them move to the same extent in opposite directions. In the movements of the plates 106 and 107 the large diagonals of these two lozenges always remain on the same line (see Figs. 24 and 25) in order that in the closing movement of the diaphragm the free opening may always preserve the form of a lozenge, the center of which always coincides with the axis of the measurer. A lever 111 linked to the two plates 106 and 107 and pivoted in the middle on the frame of the machine moves the two plates to an equal extent in opposite directions. The movements of this lever are regulated by a pin, and by a return spring. The pin 112 (Fig. 22) firmly connected with the slide 113 controlled by the arm 17 (Fig. 4) brings the plates 106 and 107 into the open position (Figs. 22 and 24) when the lever 1 moves from left to right. The return spring 114, mounted on the pivot of the lever 111 and fixed to the frame of the apparatus, tends to effect the closing of the upper diaphragm as shown by the arrow in Fig. 22, but is prevented from doing so as long as the pin retains the lever by resting on the abutment 115. At the same time, the pin 112' keeps the lower diaphragm 108 closed. When the lever 1 is moved from right to left, the pin 112 is likewise moved from right to left, and releases the stop 115 and consequently allows the spring 114 to effect the closing of the diaphragm. This closing is complete if no grain of lead hinders it. In the contrary case, that is to say, when a grain of lead is on a level with the opening and prevents the closing from being completed, this grain of lead is confined and retained by all the sides of the contracted lozenge which lock this grain without cutting it, and thus cause it to coöperate in the same degree as the diaphragm in the complete closing of the shot reservoir (see Fig. 23).

In order that the charge of shot may be regulated as desired, the measurer 105 is of variable capacity and is formed like the powder-measurer by a telescopic tube, the extension of the lower part of which is regulated by a milled nut 117 which can be rotated on the tube 105, and transmits its vertical movement to the lower tube 116 by means of the rods 118 one of which is shown in Fig. 22. A graduated scale 119 and graduated ring 117 on the nut enable the measurer to be regulated rapidly and with the greatest precision. The lower diaphragm 108 is controlled by a pin 112' fixed on the slide 113. The movements of this diaphragm are similar to those of the diaphragm 54 belonging to the powder distributer. It is of course understood that in place of this shot measurer any other known kind of measuring device might be employed. A hopper 120 situated below the distributer conveys the shot into the wadded case. Thus charged with shot this case is brought below the cardboard closing disk distributer situated one twelfth of a revolution farther on.

*Closing-disk distributer and rammer.—* This is an apparatus similar to the wad-distributer. When, as is here supposed, the cases are closed by a single disk, this distributer comprises only a single tube and one distributing tongue. This tube 121 (Fig. 3) and this tongue 122 (Fig. 4) are moreover identical with the tube, and the wad-pusher shown in Fig. 21. It is thus useless to describe them specially. It is sufficient to mention that the tongue 122 (Fig. 4) is firmly connected with the actuating slide 113 belonging to the shot distributer, and that it pushes each closing disk extracted from the tube 121 against the sides of a cylindrical opening 124, in which it remains suspended under the action of the flexible plate 125, between the case charged with shot and the rammer. The rammer 126 controlled by the lever 127 is similar to that which has been described already. The charging of the cartridge is thus terminated and nothing remains to be done beyond setting the case on the closing disk.

*Setting device.—* In the machine illustrated the setting device is situated one twelfth of a revolution farther on than the closing-disk distributer. It consists as shown in Fig. 3 of a smoothing device 128 (of any known kind), the shaft 130 of which is set in motion by the pinion 129 and the tooth-wheel 131 mounted on the shaft of a wheel 132 actuated by any kind of motor. The smoothing device is movable on its shaft 130 so that it can be lowered onto the charged cartridge brought in front of it by the arrested holder. This lowering movement is effected by hand in order that the pressure to be exercised on the smoothing device may be regulated as desired. The mechanism for lowering the smoothing device comprises the lever 133, a pinion mounted on this lever, and the rack 134 borne by the smoothing device. A spring 135 effects the return of this mechanism to its upper position when the setting is completed. In order that the cartridge 136 subjected to the action of the setting device shall not turn when the smoothing device is applied to it, it is forcibly locked against the bottom of its holder by means of a detent 137 (Figs. 3 and 4). The cam forming this detent is mounted on a shaft 138 on the upper part of which is a finger 139 situated opposite a cone 140. This cone moves up and down the shaft 130 with the smoothing device, and the rack with which it is connected by a sleeve 141. A spring 142 arranged on the shaft 130 tends to apply the detent 137 to the cartridge, but when the smoothing device is raised, the cone 140 resists this tension and the detent 137 is in the position shown in full lines in Fig. 4. The lowering of the smoothing device brings the apex of the cone in front of the finger 139, which, under the action of the spring 142, slightly rotates the cam 137. This latter thus comes against the bottom of the cartridge 136 (see position shown by dotted lines in Fig. 4) slightly before the smoothing device has begun its action.

The loading of the cartridge is now completely finished, and nothing remains but to withdraw it from its holder. This operation is effected by an automatic ejector.

*Automatic extractor*, (Figs. 4 and 26.)— This apparatus arranged one or two twelfths of a revolution farther on than the setting device is formed by two curved jaws 143 and 144 fixed to the frame. These jaws are placed in the course of the finished cartridges and seize these cartridges in the holders simultaneously by their bases and their upper ends (see Fig. 26). For this purpose one of the jaws is arranged adjacent the base and suitably bent for insertion between the side of a holder and the case lodged in this holder (Fig. 26) and the other jaw is above the holders and bent in the same manner. The charged cases thus ejected from the holders are pushed into the passage 145 by those which follow and finally drop out of the machine.

No claim is herein made to the novel features of the means illustrated and described for introducing the wads into a cartridge shell. The same forms the subject matter of a divisional application, Serial No. 824,522, filed March 13, 1914.

What is claimed is:

1. In a machine for charging sporting cartridges, the combination of a revoluble table, a series of cartridge case holders on the table and opening toward the circumference thereof, case and charge distributing devices supported above the table, a lever adapted to impart step by step rotary movement to the table, means moving with the lever and adapted to force into a holder a cartridge case delivered by the case distributing devices, and connections between said lever and the case and charge distributing devices whereby movement of the lever will effect intermittent actuation of the table and all said devices in proper order.

2. In a machine for charging sporting cartridges, the combination of a revoluble table, cartridge case holders arranged in a circle on the table, case and charge distributing devices above the table, and a lever adapted by a limited movement to impart a step-by-step rotary movement to the table and by a further movement to actuate said distributing devices.

3. In a machine for charging sporting cartridges, the combination of a revoluble table, cartridge case holders arranged in a circle on the table, case and charge distributing devices above the table, a lever, means for automatically connecting the lever and table during a portion of a movement of the lever in one direction, to impart a step-by-step rotary movement to the table, and connections between said lever and said distributing devices adapted to be actuated by a movement of the lever when disengaged from the table.

4. In a machine for charging sporting cartridges, the combination of a revoluble table, cartridge case holders arranged in a circle on the table, case and charge distributing devices above the table, a lever, means for automatically engaging and disengaging the lever and table during movement of the lever in one direction, and connections for actuating the distributing devices during further movement of the lever in the same direction.

5. In a machine for charging sporting cartridges, the combination of a revoluble table, means adapted to intermittently rotate the table, holders for receiving cartridges arranged in a circle on the table, a reservoir with an inclined bottom on which the bases of the cases to be filled rest, a slide movable below the cases in the reservoir and provided with a groove or recess open at its lower end and adapted to receive a single case and to be alternately positioned within the reservoir and at one side thereof as the slide is reciprocated, connections between the table rotating means and the slide for reciprocating the latter, and a hopper arranged between the slide and the rotating table to guide the cases to the holders successively.

6. In a machine for charging sporting cartridges, the combination of a revoluble table, a manually shiftable lever adapted to intermittently rotate the table, holders for receiving cartridges arranged in a circle on the table, and a reservoir with an inclined bottom on which the bases of the cases to be filled rest, a slide movable below the cases in the reservoir and provided with a groove or recess open at its lower end and adapted to receive a single case and to be alternately positioned within the reservoir and at one side thereof as the slide is reciprocated, connections between said lever and slide for reciprocating the latter, and a hopper arranged between said slide and the table to guide the cases to the holders on the table successively.

7. In a machine for charging sporting cartridges, the combination of a revoluble table, means adapted to intermittently rotate the table, holders for receiving cartridges arranged in a circle on the table, a reservoir with an inclined bottom on which the bases of the cases to be filled rest, a slide movable below the cases in the reservoir and provided with a groove or recess open at its lower end and adapted to receive a single case and to be alternately positioned within the reservoir and at one side thereof as the slide is reciprocated, connections between the table rotating means and the slide for reciprocating the latter, a hopper arranged between the slide and table to guide the cases to the holders on the table successively, and a stationary cam adjacent the table and adapted as the table rotates to positively force the cases into their respective holders.

8. In a machine for charging sporting cartridges, the combination of a revoluble table, holders for cartridges arranged in a circle on the table, a reservoir for cartridge cases arranged above the table, means for successively conveying the cases to be filled from the reservoir to the holders, a stationary cam arranged in the line of movement of the empty cases to force said cases into the holders, a lever adapted to impart an intermittent movement to the table and having means for coöperating with a cartridge case to insure the proper positioning thereof within its holder, charge distributing devices, and means connected with said lever for actuating said devices to fill the cases successively.

9. In a machine for charging sporting cartridges, the combination of a revoluble table, holders for cartridges arranged in a circle on the table, a lever adapted to intermittently rotate the table, means actuated by said lever for filling cases in said holders, and a stationary extractor comprising two curved arms that project into the path of and are adapted to engage the filled cartridges and remove them from the machine.

10. In a machine for charging sporting cartridges, the combination of a revoluble table, holders for cartridges arranged in a circle on the table, a lever adapted to intermittently rotate the table, a powder distributer beneath which the cartridges travel, connections between the actuating devices of said distributer and said lever, a bolt arranged adjacent the powder distributer and means whereby the bolt prevents movement of the table by said lever or actuation of the powder distributer when there is no cartridge case in the holder positioned to receive powder from said distributer.

In testimony whereof I have affixed my signature in presence of two witnesses.

JEAN JACQUES GEORGES PAUILHAC.

Witnesses:
H. C. COXE,
PAUL ROBNEY.

Copies of this patent may be obtained for five cents each, by addressing the "Commissioner of Patents, Washington, D. C."